United States Patent
Lu

(10) Patent No.: US 9,335,620 B1
(45) Date of Patent: May 10, 2016

(54) ADJUSTABLE SUPPORTING DEVICE FOR SOFT SCREEN AND PROJECTION DISPLAY DEVICE

(71) Applicant: Hisense Co., Ltd., Qingdao (CN)

(72) Inventor: Wensheng Lu, Qingdao (CN)

(73) Assignees: HISENSE CO., LTD., Qingdao (CN); HISENSE USA CORPORATION, Suwanee, GA (US)

( * ) Notice: Subject to any disclaimer, the term of this patent is extended or adjusted under 35 U.S.C. 154(b) by 0 days.

(21) Appl. No.: 14/743,287

(22) Filed: Jun. 18, 2015

(30) Foreign Application Priority Data

Dec. 26, 2014 (CN) .......................... 2014 1 0836798

(51) Int. Cl.
  *G03B 21/56* (2006.01)
  *G03B 21/58* (2014.01)
  *A47G 1/16* (2006.01)

(52) U.S. Cl.
  CPC *G03B 21/58* (2013.01); *A47G 1/16* (2013.01); *A47G 1/1606* (2013.01)

(58) Field of Classification Search
  CPC ......... G03B 21/56; G03B 21/58; E06B 9/521
  USPC ........................ 359/443; 160/374, 374.1, 378
  See application file for complete search history.

(56) References Cited

U.S. PATENT DOCUMENTS

| | | | | | |
|---|---|---|---|---|---|
| 1,472,069 | A | * | 10/1923 | Helgeson | E06B 9/52 160/369 |
| 1,916,023 | A | * | 6/1933 | Shull | B44D 3/185 160/374.1 |
| 3,448,551 | A | * | 6/1969 | Heller | E04C 2/08 160/374.1 |
| 3,494,409 | A | * | 2/1970 | Prechtl | B44D 3/185 160/374.1 |
| 4,161,977 | A | * | 7/1979 | Baslow | A47G 1/0605 160/327 |
| 5,271,171 | A | * | 12/1993 | Smith | D06C 3/08 101/127.1 |
| 6,053,558 | A | * | 4/2000 | Weldy | B60J 7/102 160/374.1 |
| 8,793,910 | B2 | * | 8/2014 | Froio | G09F 15/00 160/374.1 |
| 2010/0053747 | A1 | * | 3/2010 | Maruyama | G03B 21/58 359/443 |

* cited by examiner

*Primary Examiner* — Christ Mahoney

(74) *Attorney, Agent, or Firm* — Harness, Dickey & Pierce, P.L.C.

(57) ABSTRACT

The disclosure discloses an adjustable supporting device and a projection display device. The adjustable supporting device includes a frame and a plurality of strip-shaped connectors, wherein the frame includes a plurality of sub-frames connected in order, and a strip-shaped groove is arranged on the outer wall of each of the sub-frames and extends in the length direction of the sub-frames; each of the strip-shaped connectors has one side installed in corresponding one strip-shaped groove, and the other side located outside the strip-shaped groove to be connected with a side of the soft screen, and a position-limiting protrusion is arranged on the side of the strip-shaped connector located in the strip-shaped groove; and an automatic force adjusting unit is arranged between the strip-shaped groove and the corresponding strip-shaped connector.

20 Claims, 5 Drawing Sheets

ADJUSTABLE SUPPORTING DEVICE FOR SOFT SCREEN AND PROJECTION DISPLAY DEVICE

CROSS-REFERENCE TO RELATED APPLICATION

This application claims the benefit and priority of Chinese Patent Application No. 201410836798.3 filed Dec. 26, 2014. The entire disclosure of the above application is incorporated herein by reference.

FIELD

The present disclosure relates to the field of display technologies and particularly to an adjustable supporting device for a soft screen and a projection display device.

BACKGROUND

This section provides background information related to the present disclosure which is not necessarily prior art.

A super short-throw laser TV set has been developed rapidly due its wide color gamut, high brightness, long service lifetime, energy saving, environment conservation and other advantages. The super short-throw laser TV set includes a projector (a laser) and a projection screen used in cooperation with the projector. In use, the projection screen is typically installed on a wall, and light projected by the projector onto the projection screen is reflected by the projection screen into eyes of watchers along a preset light path to thereby generate an image. For the light projected by the projector to be reflected by the projection screen, the projection screen is required to be highly flat. The traditional projection screen is typically embodied as a hard screen, and although the hard screen is perfectly flat, if the size of the projection screen is large (more than 120 inches), then the projection screen may be costly and also very inconvenient to transport, install and repair.

In view of this, a soft screen has been widely used in recent years as a projection screen because the soft screen can be made in a very large size and can be rolled for transportation, but the soft screen installed on the wall may be poorly flat.

SUMMARY

This section provides a general summary of the disclosure, and is not a comprehensive disclosure of its full scope or all of its features.

The disclosure provides an adjustable supporting device for a soft screen including a frame and a plurality of strip-shaped connectors, wherein:

the frame includes a plurality of sub-frames connected in order, and a strip-shaped groove is arranged on the outer wall of each of the sub-frames and extends in the length direction of each of the sub-frames;

each of the strip-shaped connectors has one side installed in corresponding one the strip-shaped groove, and the other side located outside the strip-shaped groove to be connected with a side of the soft screen, and a position-limiting protrusion is arranged on the side of the strip-shaped connector located in the strip-shaped groove to prevent the strip-shaped connector from falling out of the strip-shaped groove; and an automatic force adjusting unit is arranged between the strip-shaped groove and corresponding strip-shaped connector to provide the strip-shaped connector with a push force outward in the direction perpendicular to the strip-shaped groove and to generate a varying push force as the soft screen expands when heated and contracts when cooled.

The disclosure further provides a projection display device including a projector and a soft screen used in cooperation with the projector, wherein the soft screen is supported and unfolded by the adjustable supporting device above.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

REFERENCE NUMERALS

Figure 1:
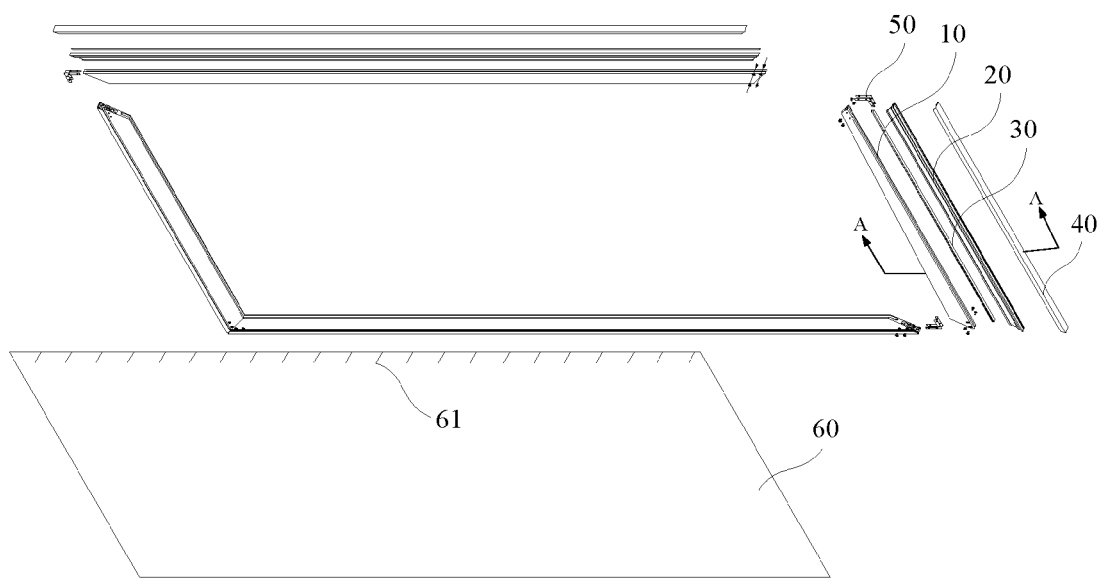
FIG. 1 illustrates an exploded view of the entire adjustable supporting device according to an embodiment of the disclosure.

10—Sub-frame
11—Strip-shaped groove
12—Chamfer
13—Wall-hung groove
20—Strip-shaped connector
21—Positioning groove
30—Automatic force adjusting unit
31—Strip-shaped magnet
40—Decorating member
41—Strip-shaped buckle
42—Flange
50—Corner connector
60—Soft screen
61—Locking bolt
70—Wall-hung bracket Corresponding reference numerals indicate corresponding parts throughout the several views of the drawings.

DETAILED DESCRIPTION

Example embodiments will now be described more fully with reference to the accompanying drawings.

Referring to FIG. 1 to FIG. 5 and FIG. 7, an adjustable supporting device for a soft screen according to an embodiment of the disclosure includes a frame and a plurality of strip-shaped connectors 20, where:

The frame includes a plurality of sub-frames 10 connected in order, and for each of the sub-frames 10, a strip-shaped groove 11 extending in the length direction of the sub-frame 10 is arranged on the outer wall of the sub-frame; each of the strip-shaped connectors 20 has one side installed in corresponding one strip-shaped groove 11, and the other side located outside the strip-shaped groove 11 to be connected with a side of a soft screen 60, and the strip-shaped connector 20 has a position-limiting protrusion (not illustrated) arranged on one side thereof located in the strip-shaped groove 11, to prevent the strip-shaped connector 20 from falling out of the strip-shaped groove 11; and an automatic force adjusting unit 30 is arranged between the strip-shaped groove 11 and the corresponding strip-shaped connector 20 to provide the strip-shaped connector 20 with a push force outward in the direction perpendicular to the strip-shaped groove 11 (i.e., a push force toward an opening of the strip-shaped groove 11) and to generate a varying push force as the soft screen 60 expands when heated and contracts when cooled.

In the adjustable supporting device above, the respective components can be connected removably and thus can be transported separately, so that they will be convenient to transport. In use, firstly the respective sub-frames 10 are connected one after another to form into the frame as required, then at least one automatic force adjusting unit 30 is installed in each of the strip-shaped grooves 11, and next one end of each of the strip-shaped connectors 20 is installed in the corresponding strip-shaped groove 11, and the respective strip-shaped connectors 20 protrude outward while the push forces provided by their corresponding automatic force adjusting units 30 being applied thereto, thus resulting in an outer frame structure adapted to the shape of the soft screen 60. After the respective strip-shaped connectors 20 are assembled on the frame, the frame in which the respective strip-shaped connectors 20 and the automatic force adjusting units 30 are integrated is installed on a wall for such a benefit that at this time the soft screen 60 has not yet been installed on the assembled frame so that a human installer can directly watch and detect the positional precision and the levelness of the frame installed on the wall for appropriateness to thereby lower the number of times that the frame is debugged and improve the efficiency with installing the frame. Next the soft screen 60 is installed, where the human installer firstly presses the strip-shaped connectors 20 into the frame so that the strip-shaped connectors 20 are pressed into the corresponding strip-shaped grooves 11 to make the distance between two facing strip-shaped connectors 20 equal to the distance between two facing sides of the unfolded soft screen 60, and then the respective sides of the soft screen 60 can be connected with the strip-shaped connectors 20 using a plurality of locking bolts 61, and after the soft screen 60 is connected with the strip-shaped connectors 20, the external forces applied to the strip-shaped connectors 20 are repealed, and the strip-shaped connectors 20 protrude outward due to the corresponding automatic force adjusting units 30 so that the software screen 60 is unfolded flat to thereby guarantee the flatness of the software screen 60.

As can be apparent from the description above, since the respective strip-shaped connectors 20, connected with the sides of the soft screen 60, protrude outward due to the push forces provided by the corresponding automatic force adjusting units 30, so that the soft screen 60 subjected to pull forces of the respective strip-shaped connectors 20 is unfolded flat. When the soft screen 60 expands when heated and contracts when cooled differently with varying temperature (varying seasons), the automatic force adjusting units 30 can adjust the magnitudes of the push forces applied on the strip-shaped connectors 20 automatically according to the variation of soft screen 60 expanding when heated and contracting when cooled, to thereby vary the lengths by which the strip-shaped connectors 20 protrude beyond the strip-shaped grooves 11. Particularly when the soft screen 60 contracts when cooled, the strip-shaped connectors 20 subjected to the shrinking force of the soft screen 60 will move toward inside of the strip-shaped grooves 11 in the direction perpendicular to the strip-shaped grooves 11; and in order to overcome the shrinking force of the soft screen 60, the push forces generated by the automatic force adjusting units 30 become larger as the strip-shaped connectors 20 move toward inside of the strip-shaped grooves 11, so that the strip-shaped connectors 20 are pushed to protrude beyond the strip-shaped grooves by some length to thereby maintain the appropriate flatness of the soft screen 60; and when the soft screen 60 expands when heated, the soft screen 60 becomes relaxed, and at this time no compressive force of the soft screen 60 needs to be overcome, and the push forces generated by the automatic force adjusting units 30 become less and push the strip-shaped connectors 20 to further protrude outward in the direction perpendicular to the strip-shaped grooves 11 to thereby maintain the appropriate flatness of the soft screen 60. Accordingly as compared with the prior art, the adjustable supporting device according to the embodiment of the disclosure can adjust the flatness of the soft screen 60 automatically according to the varying soft screen 60 which expands when heated and contracts when cooled, so that the soft screen 60 can provide a better display effect of an image and also the service lifetime of the soft screen 60 can be prolonged.

Moreover since the soft screen 60 is connected with one side of the strip-shaped connector 20 located outside the strip-shaped groove 11, and the other side of the strip-shaped connector 20 located inside the strip-shaped groove 11 is hidden by the strip-shaped groove 11, thus after the soft screen 60 is installed on the adjustable supporting device above, the soft screen 60 can shield the strip-shaped connector 20 so that the adjustable supporting device above will not result in any increase in width of a non-display area of the soft screen 60 to thereby accommodate a required design of a narrow sub-frame of the soft screen 60.

In a particular implementation, the automatic force adjusting unit 30 can be elastic member or magnet component. When the automatic force adjusting unit 30 is an elastic member, referring to FIG. 3 to FIG. 5, the elastic member can particularly be rubber strip or strip-shaped elastic sheet with the same length as the length of the strip-shaped groove 11. During installation, the rubber strip or the strip-shaped elastic sheet is installed on the bottom of the strip-shaped groove 11, and after one end of the strip-shaped connector 20 is installed in the strip-shaped groove 11, the rubber strip or the strip-shaped elastic sheet is compressed to thereby push the strip-shaped connector 20 to protrude outward. It is worthy noted that, in one embodiment, the elastic member is strip-shaped sheet, so that the service lifetime of the automatic force adjusting unit 30 can be improved and the performance of the automatic force adjusting unit 30 in use can be guaranteed due to the anti-aging characteristic of the strip-shaped sheet.

The elastic member can be compressive spring in addition to the rubber strip or the strip-shaped elastic sheet. In order to ensure the strip-shaped connector 20 to be subject to equalized force, when the elastic member is the compressive spring, there are at least two compressive springs arranged between the corresponding strip-shaped groove 11 and strip-shaped connector 20, and when there are two compressive springs arranged between the corresponding strip-shaped groove 11 and strip-shaped connector 20, the two compressive springs are located proximate to the ends of the strip-shaped groove 11; and when there are three or more compressive springs arranged between the corresponding strip-shaped groove 11 and strip-shaped connector 20, the remaining compressive springs other than the two compressive springs arranged proximate to the ends are distributed uniformly. It shall be noted that in order to prevent the compressive springs from being pushed out of the strip-shaped groove 11 when the strip-shaped connector 20 is installed, position-limiting grooves or position-limiting pins are further arranged at the bottom of the strip-shaped groove 11 to fix the compressive springs.

Figure 6:
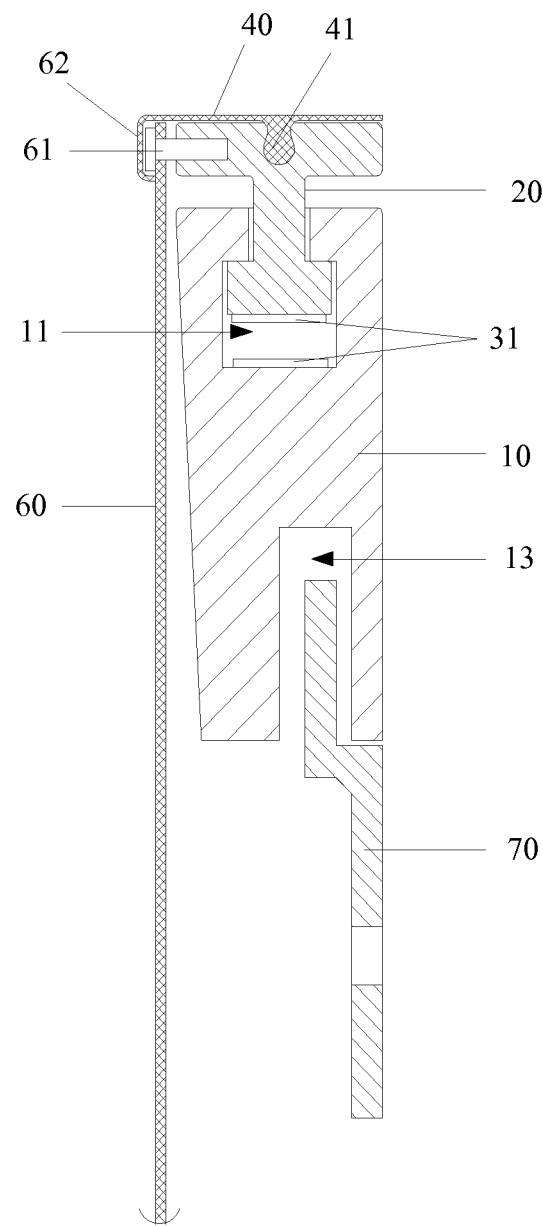
FIG. 6 illustrates a schematic diagram of the automatic force adjusting units in FIG. 1 which is a magnet component.
Figure 7:
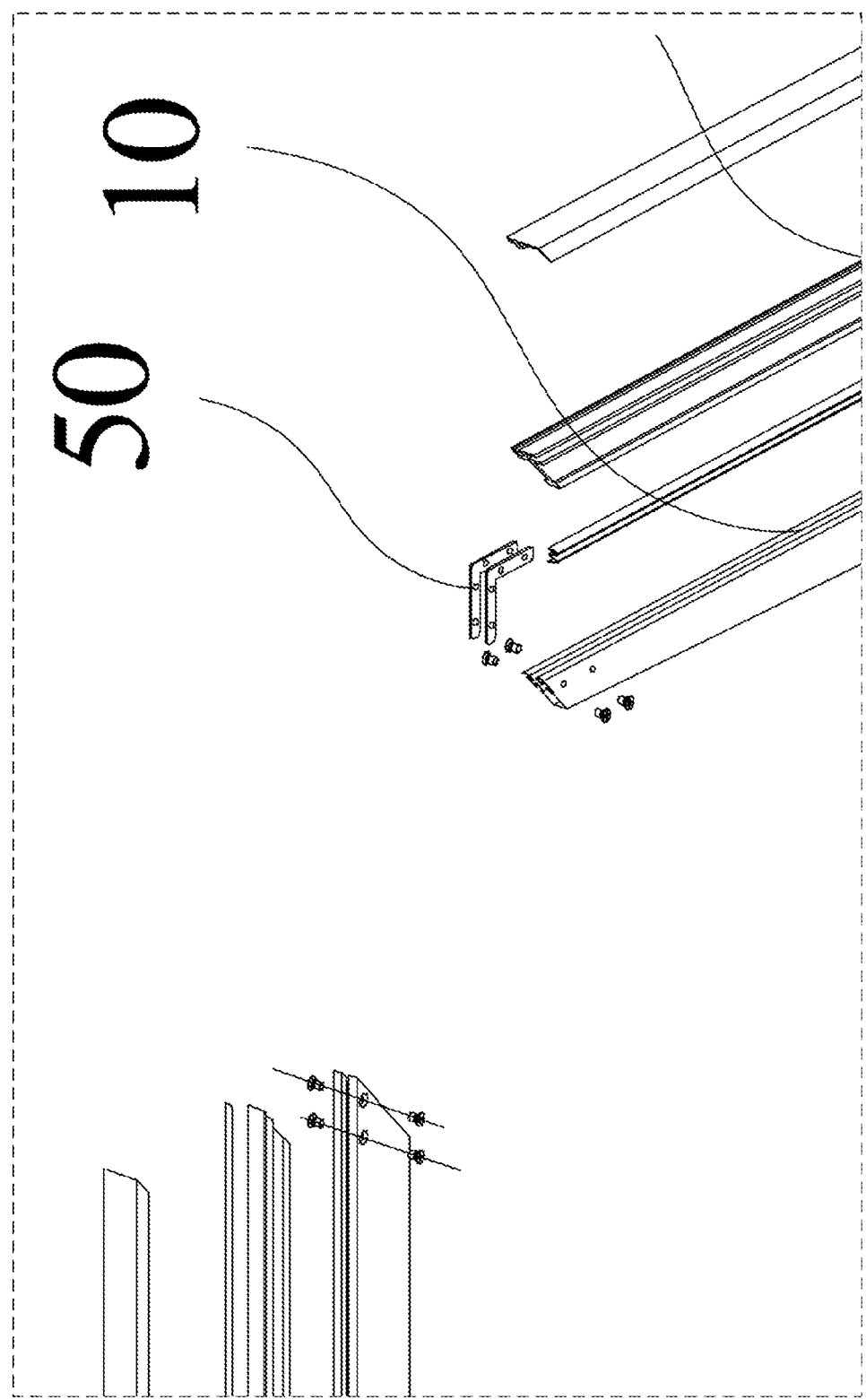
FIG. 7 illustrates a partial enlarged view of the device of FIG. 1.

Referring to FIG. 6, when the automatic force adjusting unit 30 is a magnet component, the magnet component can be two strip-shaped magnets 31 with the same polarity arranged opposite to each other, where one of the strip-shaped magnets 31 is installed at the bottom of the strip-shaped groove 11, and the other strip-shaped magnet is installed on the strip-shaped connector 20. Since the two strip-shaped magnets 31 with the same polarity are arranged opposite to each other, there will be a repulsion force occurring between the two strip-shaped magnets 31 to thereby push the strip-shaped connector 20 to protrude outward. It is worthy noted that the magnet components each can alternatively be a pair of magnetic blocks with the same polarity arranged opposite to each other, and at this time at least two pairs of magnetic blocks with the same polarity need to be arranged between the corresponding strip-shaped groove 11 and strip-shaped connector 20.

The shape of the frame is similar to the shape of the soft screen 60, and the pattern formed by the respective strip-shaped connectors 20 installed in their corresponding strip-shaped grooves 11 is also similar to the shape of the soft screen 60, or the outer frame structure in which the respective strip-shaped connectors 20 are installed in their corresponding strip-shaped grooves 11 matches the soft screen 60 so that the soft screen 60 is unfolded flat. For example, the shape of the soft screen 60 is a round or a regular polygon, the outer frame structure by the respective strip-shaped connectors 20 being installed in their corresponding strip-shaped grooves 11 is also be a round or a regular polygon.

Figure 2:
FIG. 2 illustrates a schematic structural diagram of the frame in FIG. 1.
Figure 3:
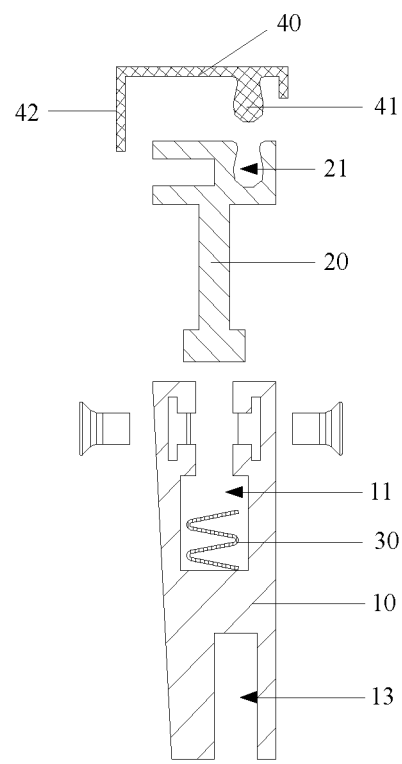
FIG. 3 illustrates an exploded sectional view along the A-A line in FIG. 1.
Figure 4:
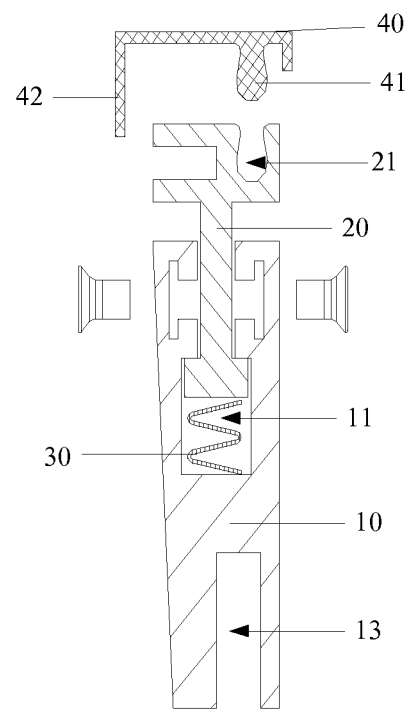
FIG. 4 illustrates a schematic diagram of the strip-shaped connectors and the automatic force adjusting units in FIG. 3 assembled in a strip-shaped groove.

Further referring to FIG. 1 and FIG. 2, in this embodiment, the soft screen 60 is in a rectangle, and correspondingly the frame is a rectangular frame with four sub-frames 10. In one embodiment, the sub-frames 10 are made of light-weight material, such as an aluminum alloy or a magnesium alloy, to thereby lower the overall weight of the adjustable supporting device. The strip-shaped grooves 11 are opened on the outer wall of the sub-frames 10, the lengths of the strip-shaped grooves 11 are same as the lengths of the sub-frames 10 where they are located so that the strip-shaped connectors 20 are inserted conveniently from one ends of the strip-shaped grooves 11, that is, the strip-shaped connectors 20 are installed conveniently in the strip-shaped grooves 11; and there are gradually increasing cross sectional areas from the openings of the strip-shaped grooves 11 to the bottoms of the strip-shaped grooves 11 to thereby prevent the strip-shaped connectors 20 installed in the strip-shaped grooves 11 from falling out of the strip-shaped grooves 11, and further referring to FIG. 5, the cross sections of the strip-shaped grooves 11 are shaped as "T", and the cross sections of the strip-shaped connectors 20 are shaped as "⊥".

Further referring to FIG. 1, in order to improve the strength of the frame, in one embodiment, a corner connector 50 connected respectively with two sub-frames 10 is arranged on either of the sides of the site where the two sub-frames 10 are connected, or a corner connector 50 connected respectively with two sub-frames 10 is arranged on each of the sides of the site where the two sub-frames 10 are connected. The shape of the corner connector is the same as the shape formed by two connected sub-frames 10, for example, if the two connected sub-frames 10 are shaped as "L", then the corner connector 50 is an L-shaped corner connector.

Referring to FIG. 2, chamfers 12 are formed respectively on both ends of the sub-frames 10, and the chamfers 12 of the two connected sub-frames 10 are engaged with each other. Such a design can lower the size of the site where the two sub-frames 10 are connected so that the soft screen 60 can more easily accommodate a required design of a narrow sub-frame thereof.

In the adjustable supporting device above, the frame in which the strip-shaped connectors 20 ad the automatic force adjusting units 30 are integrated can be installed on the wall in two alternatives. Particularly further referring to FIG. 5, the frame is hung on the wall through wall-hung brackets 70, and correspondingly wall-hung grooves 13 used in cooperation with the wall-hung brackets 70 are arranged on the sub-frames 10; or the frame is installed on the wall through wall bolts, and correspondingly bolt holes through which the wall bolts pass are arranged on the sub-frames 10.

Figure 5:
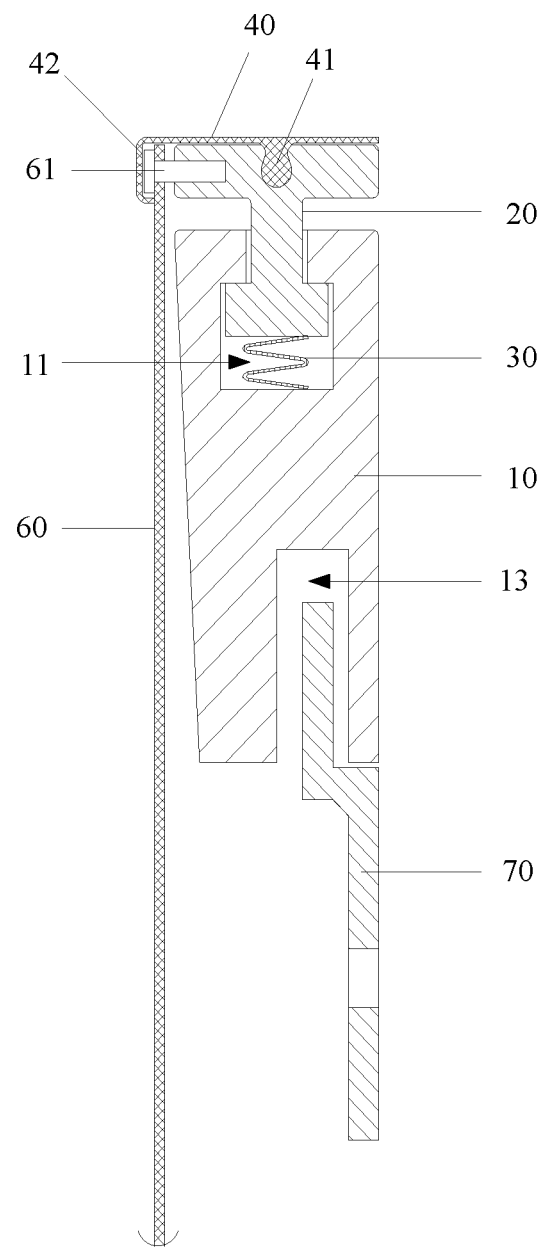
FIG. 5 illustrates a schematic diagram of a decorating member and a soft screen assembled on the strip-shaped connectors in FIG. 4.

Referring to FIG. 1 and FIG. 5, the corresponding strip-shaped connectors 20 are connected with the sides of the soft screen 60 through the plurality of locking bolts 61, so after the soft screen 60 is installed, the areas on the sides of the soft screen 60 in which the strip-shaped connectors 20 are connected may be exposed, thus degrading the aesthetic appearance of the soft screen 60. In view of this, the adjustable supporting device above further includes a plurality of decorating members 40, each of which is engaged with the strip-shaped connector 20 to shield the area of the soft screen connected with the strip-shaped connector 20. Particularly a positioning groove 21 is arranged on the strip-shaped connector 20, the positioning groove 21 extends in the length direction of the strip-shaped connector, and a strip-shaped buckle 41 is arranged on the decorating member 40 to be engaged with the positioning groove 21; and a flange 42 is arranged on one side of the decorating member 40 to shield the area of the soft screen 60 connected with the strip-shaped connector 20, and after the decorating member 40 is installed on the strip-shaped connector 20, the flange 42 shields the area of the soft screen 60 connected with the strip-shaped connector 20, to thereby avoid the area of the soft screen 60 connected with the strip-shaped connector 20, from being exposed, so as to improve the aesthetic appearance of the soft screen 60.

An embodiment of the disclosure further provides a projection display device including a projector, and a soft screen used in cooperation with the projector, where the soft screen is supported and unfolded by the adjustable supporting device according to the embodiment above. In the projection display device according to the embodiment of the disclosure, the flatness of the soft screen can be guaranteed by the adjustable supporting device, and the flatness of the soft screen can be adjusted automatically to the varying soft screen expanding when heated and contracting when cooled, and also the service lifetime of the soft screen can be prolonged. Moreover since the respective strip-shaped connectors connected with the sides of the soft screen are hidden at the back side of the soft screen, the width of a non-display area of the soft screen can be lowered to thereby accommodate a required design of a narrow sub-frame of the soft screen.

In the description above of the embodiments of the disclosure, the particular features, structures, materials or characteristics can be combined as appropriate in any one or more embodiments or instances.

In the adjustable supporting device according to the disclosure, since the respective strip-shaped connectors, connected with the sides of the soft screen, protrude outside due to the push forces provided by their corresponding automatic force adjusting units, so that the soft screen subjected to the pull forces of the respective strip-shaped connectors is unfolded flat. When the soft screen expands when heated and contracts when cooled differently with varying temperature, the automatic force adjusting units can generate different push forces automatically according to the variation of soft screen expanding when heated and contracting when cooled, to thereby vary the lengths by which the strip-shaped connectors are pushed to protrude beyond the strip-shaped grooves. Particularly when the soft screen contracts when cooled, the strip-shaped connectors subjected to the shrinking force of the soft screen will move toward inside of the strip-shaped grooves in the direction perpendicular to the strip-shaped grooves; and in order to overcome the shrinking force of the soft screen, the push forces generated by the automatic force adjusting units become larger as the strip-shaped connectors move toward inside of the strip-shaped grooves, so that the strip-shaped connectors are pushed to protrude beyond the strip-shaped grooves by some length to thereby maintain the appropriate flatness of the soft screen; and when the soft screen expands when heated, the soft screen becomes relaxed, and at this time no compressive force of the soft screen needs to be overcome, and the push forces generated by the automatic force adjusting units become less and push the strip-shaped connectors to further protrude outward in the direction perpendicular to the strip-shaped grooves to thereby maintain the appropriate flatness of the soft screen. Accordingly as compared with the prior art, the adjustable supporting device according to the embodiment of the disclosure can adjust the flatness of the soft screen automatically to the variation of soft screen expanding when heated and contracting when cooled so that the soft screen can provide a better display effect of an image and also the service lifetime of the soft screen can be prolonged.

Moreover since the soft screen is connected with the sides of the strip-shaped connectors located outside the strip-shaped grooves, and the sides of the strip-shaped connectors located inside the strip-shaped grooves are hidden by the strip-shaped grooves, after the soft screen is installed on the adjustable supporting device above, the soft screen can shield the strip-shaped connectors so that the adjustable supporting device above will not result in any increase in width of a non-display area of the soft screen to thereby accommodate a required design of a narrow sub-frame of the soft screen.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An adjustable supporting device for a soft screen, comprising a frame and a plurality of strip-shaped connectors, wherein: the frame comprises a plurality of sub-frames connected in order, and a strip-shaped groove is arranged on an outer wall of each of the sub-frames and extends in the length direction of each of the sub-frames; each of the strip-shaped connectors has one side installed in corresponding one strip-shaped groove, and the other side located outside the strip-shaped groove to be connected with a side of the soft screen, and a position-limiting protrusion is arranged on the side of the strip-shaped connector located in the strip-shaped groove to prevent the strip-shaped connector from falling out of the strip-shaped groove; and an automatic force adjusting unit is arranged between the strip-shaped groove and corresponding strip-shaped connector to provide the strip-shaped connector with a push force outward in the direction perpendicular to the strip-shaped groove and to generate a varying push force as the soft screen expands when heated and contracts when cooled.

2. The adjustable supporting device according to claim 1, wherein the automatic force adjusting unit is an elastic member or a magnet component.

3. The adjustable supporting device according to claim 2, wherein the elastic member is a rubber strip or a strip-shaped elastic sheet with the same length as the length of the strip-shaped groove.

4. The adjustable supporting device according to claim 2, wherein the elastic member is a compressive spring, and there are at least two compressive springs arranged between the corresponding strip-shaped groove and strip-shaped connector.

5. The adjustable supporting device according to claim 2, wherein the magnet component is two strip-shaped magnets with the same polarity arranged opposite to each other, wherein one of the strip-shaped magnets is installed in the strip-shaped groove, and the other strip-shaped magnet is installed on the strip-shaped connector.

6. The adjustable supporting device according to claim 1, wherein a cross section of the strip-shaped groove is in a "T" shape, and the cross section of the strip-shaped connector is in a "⊥" shape.

7. The adjustable supporting device according to claim 1, wherein a corner connector connected respectively with two of the sub-frames is arranged on either of sides of a site where the two sub-frames are connected, or a corner connector connected respectively with two of the sub-frames is arranged on each of the sides of the site where the two sub-frames are connected.

8. The adjustable supporting device according to claim 7, wherein chamfers are formed respectively on both ends of the sub-frames, and the chamfers of the two connected sub-frames are engaged with each other.

9. The adjustable supporting device according to claim 1, wherein the frame is hung on the wall through wall bolts or wall-hung brackets, and correspondingly bolt holes through which the wall bolts pass are arranged on the sub-frames, or wall-hung grooves used in cooperation with the wall-hung brackets are arranged on the sub-frames.

10. The adjustable supporting device according to claim 1, further comprising a plurality of decorating members engaged with the strip-shaped connectors to shield areas of the soft screen connected with the strip-shaped connectors.

11. A projection display device, comprising a projector, and a soft screen used in cooperation with the projector, the soft screen is supported and unfolded by the adjustable supporting device; wherein the adjustable supporting device comprising a frame and a plurality of strip-shaped connectors, wherein:
the frame comprises a plurality of sub-frames connected in order, and a strip-shaped groove is arranged on an outer wall of each of the sub-frames and extends in the length direction of each of the sub-frames;

each of the strip-shaped connectors has one side installed in corresponding one strip-shaped groove, and the other side located outside the strip-shaped groove to be connected with a side of the soft screen, and a position-limiting protrusion is arranged on the side of the strip-shaped connector located in the strip-shaped groove to prevent the strip-shaped connector from falling out of the strip-shaped groove; and an automatic force adjusting unit is arranged between the strip-shaped groove and corresponding strip-shaped connector to provide the strip-shaped connector with a push force outward in the direction perpendicular to the strip-shaped groove and to generate a varying push force as the soft screen expands when heated and contracts when cooled.

12. The projection display device according to claim 11, wherein the automatic force adjusting unit is an elastic member or a magnet component.

13. The projection display device according to claim 12, wherein the elastic member is a rubber strip or a strip-shaped elastic sheet with the same length as the length of the strip-shaped groove.

14. The projection display device according to claim 12, wherein the elastic member is a compressive spring, and there are at least two compressive springs arranged between the corresponding strip-shaped groove and strip-shaped connector.

15. The projection display device according to claim 12, wherein the magnet component is two strip-shaped magnets with the same polarity arranged opposite to each other, wherein one of the strip-shaped magnets is installed in the strip-shaped groove, and the other strip-shaped magnet is installed on the strip-shaped connector.

16. The projection display device according to claim 11, wherein a cross section of the strip-shaped groove is in a "T" shape, and the cross section of the strip-shaped connector is in a "⊥" shape.

17. The projection display device according to claim 11, wherein a corner connector connected respectively with two of the sub-frames is arranged on either of sides of a site where the two sub-frames are connected, or a corner connector connected respectively with two of the sub-frames is arranged on each of the sides of the site where the two sub-frames are connected.

18. The projection display device according to claim 17, wherein chamfers are formed respectively on both ends of the sub-frames, and the chamfers of the two connected sub-frames are engaged with each other.

19. The projection display device according to claim 11, wherein the frame is hung on the wall through wall bolts or wall-hung brackets, and correspondingly bolt holes through which the wall bolts pass are arranged on the sub-frames, or wall-hung grooves used in cooperation with the wall-hung brackets are arranged on the sub-frames.

20. The projection display device according to claim 11, further comprising a plurality of decorating members engaged with the strip-shaped connectors to shield areas of the soft screen connected with the strip-shaped connectors.

* * * * *